United States Patent
Miller et al.

(10) Patent No.: US 7,415,624 B2
(45) Date of Patent: *Aug. 19, 2008

(54) SYSTEM AND METHOD FOR SAVING POWER IN A WIRELESS NETWORK BY REDUCING POWER TO A WIRELESS STATION FOR A TIME INTERVAL IF A RECEIVED PACKET FAILS AN INTEGRITY CHECK

(75) Inventors: Donald J. Miller, Annandale (AU); Andrew F. Myles, St. Ives (AU); Alex C. K. Lam, Chatswood (AU); David S. Goodall, Randwick (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/743,603

(22) Filed: May 2, 2007

(65) Prior Publication Data

US 2007/0201419 A1    Aug. 30, 2007

Related U.S. Application Data

(63) Continuation of application No. 10/819,580, filed on Apr. 6, 2004, now Pat. No. 7,231,530.

(51) Int. Cl.
*G06F 1/00* (2006.01)
*G06F 1/32* (2006.01)
*H03M 11/00* (2006.01)
*H03M 13/00* (2006.01)
*H04L 1/00* (2006.01)

(52) U.S. Cl. ............... 713/320; 713/300; 713/324; 714/777; 714/781; 714/799; 709/230; 455/343.1; 455/343.2; 455/343.4

(58) Field of Classification Search ............... 713/320, 713/324, 300; 714/777, 781, 799; 709/230; 455/343.1, 343.2, 343.3
See application file for complete search history.

(56) References Cited

U.S. PATENT DOCUMENTS

| | | | |
|---|---|---|---|
| 6,181,259 B1 | 1/2001 | Yamashita | 340/901 |
| 6,847,912 B2 | 1/2005 | Forster | 702/130 |
| 7,202,826 B2 * | 4/2007 | Grant et al. | 343/713 |
| 7,231,530 B1 * | 6/2007 | Miller et al. | 713/320 |

(Continued)

OTHER PUBLICATIONS

Tenenbaum Andrew, Computer Networks, 1996, Prentice Hall Inc., 3rd Ed., pp. 186-190.*

(Continued)

*Primary Examiner*—Mark Connolly
(74) *Attorney, Agent, or Firm*—Dov Rosenfeld; Inventek

(57) ABSTRACT

A method, an apparatus and a carrier medium storing instructions to implement the method. The method is in a first wireless station of a wireless network, and includes wirelessly receiving a signal corresponding to a packet wirelessly transmitted by a second wireless station. The packet includes a subpacket and a check sequence. The method further includes verifying the integrity of the subpacket, the verifying at least using the check sequence. The method further includes, in the case that the subpacket fails the verifying, reducing the power consumption of at least one component in the first wireless station for a time interval.

14 Claims, 9 Drawing Sheets

U.S. PATENT DOCUMENTS

| | | | | |
|---|---|---|---|---|
| 7,295,827 | B2* | 11/2007 | Liu et al. | 455/343.2 |
| 7,340,615 | B2* | 3/2008 | Krantz et al. | 713/300 |
| 2004/0029621 | A1 | 2/2004 | Karaoguz et al. | 455/574 |
| 2004/0071091 | A1 | 4/2004 | Blanc et al. | 370/246 |

OTHER PUBLICATIONS

U.S. Appl. No. 10/629,383, filed Jul. 2003, Keaney et al.

* cited by examiner

OFDM IEEE 802.11 PLCP Header

Rsv = Reserved
Par = Parity
L11 = Length[11]
S0 = Service[7]

SYSTEM AND METHOD FOR SAVING POWER IN A WIRELESS NETWORK BY REDUCING POWER TO A WIRELESS STATION FOR A TIME INTERVAL IF A RECEIVED PACKET FAILS AN INTEGRITY CHECK

RELATED PATENT APPLICATIONS

This invention claims priority of and is a continuation of U.S. patent application Ser. No. 10/819,580 filed Apr. 6, 2004 now U.S. Pat. No. 7,231,530 to inventors Miller, et al., titled "A SYSTEM AND METHOD FOR SAVING POWER IN A WIRELESS NETWORK BY REDUCING POWER TO A WIRELESS STATION FOR A TIME INTERVAL IF A RECEIVED PACKET FAILS AN INTEGRITY CHECK,". The contents of U.S. patent application Ser. No. 10/819,580 are incorporated herein by reference.

This invention is also related to commonly assigned U.S. patent application Ser. No. 10/819,771, now U.S. Pat. No. 7,055,086, filed Apr. 6, 2004 to inventor Lam titled "METHOD AND APPARATUS FOR PROTECTING PARTS OF A PACKET IN A WIRELESS NETWORK." The contents of U.S. patent application Ser. No. 10/819,771 are incorporated herein by reference, and hereby referred to as Lam.

BACKGROUND

This invention relates to wireless networks, to wireless stations of a wireless network, and in particular to power saving in a wireless station of a wireless network such as a wireless local area network (WLAN). It is for example applicable to a wireless station that conforms to any of the OFDM variants of the IEEE 802.11 standard such as IEEE 802.11a and IEEE 802.11g, and to future derivatives thereof.

Use of wireless networks such as wireless local area networks (WLANs) is becoming widespread. A WLAN may be ad hoc, in that any wireless station may communicate directly with any other wireless station, or have an infrastructure in which a wireless station can only communicate with another station via a central station called an access point (AP). The access point is typically coupled to other networks that may be wired or wireless, e.g., to the Internet or to an intranet. Wireless stations of a wireless network thus wirelessly transmit and receive signals that include modulated data over one or more transmission channels, to transmit data from one wireless station to another.

Portable wireless stations are a popular class of wireless stations used in wireless networks. Such wireless stations include cellular phones, laptop computers, wireless digital cameras, battery-backed access points, etc. Portable wireless stations are typically battery-powered and the battery life is limited, e.g., they can only function for a limited time until the battery needs to be re-charged.

Such portable wireless stations increasingly use one of the orthogonal frequency division multiplexing (OFDM) variants of the IEEE 802.11 standard, e.g., IEEE 802.11a, IEEE 802.11g, etc. OFDM modulation breaks up data to be transmitted into several subcarriers, allowing for greater signal reliability and transmission speeds. Unfortunately, multi-carrier frequency approaches can sometimes translate into higher power consumption in a transmitting and/or receiving wireless station. In other words, portable OFDM wireless stations can have a shorter battery-powered lifetime compared to portable non-OFDM wireless stations, e.g., portable wireless stations conforming to the IEEE 802.11b standard.

Therefore there is a need in the art to provide a power saving method and apparatus for a wireless station of a wireless network that uses OFDM.

A common power reduction technique is to simply turn off or put to a lower-power mode-in either case called "put to sleep" herein-those components that are not being used and to then turn on ("wake up") those components only when they are needed. The current IEEE 802.11 standard and its derivatives provide for a power save mode that allows for one or more components of a wireless station to be put to sleep, e.g., the physical (PHY) unit of a wireless station, for some portion of its operating period. A wireless station in power save mode essentially puts one or more components to sleep and then periodically wakes up those components necessary to transmit and/or receive transmissions. A neighboring wireless station, e.g., another wireless station in an ad-hoc network or an access point (AP) or client station in an infrastructure network, buffers, e.g., stores, any packets destined to the wireless station in power save mode until it transmits a request for such buffered packets.

Unfortunately the current IEEE 802.11 power save mode has a significant drawback, namely that it is "coarse-grained:" when a wireless station is in power save mode, it only wirelessly receives packets in periodic intervals as defined by the standard. Such a power saving mode can affect the latency, e.g., the responsiveness, of received transmissions.

Therefore there is a need in the art to provide a more fine-grained power saving method and apparatus for a wireless station of a wireless network.

SUMMARY

Disclosed herein are a method and a carrier medium storing instructions to implement the method. The method is in a first wireless station of a wireless network. The method comprises wirelessly receiving a signal corresponding to a packet wirelessly transmitted by a second wireless station. The packet includes a subpacket and a check sequence. The method further comprises verifying the integrity of the subpacket, the verifying at least using the check sequence. The method further comprises, in the case that the subpacket fails the verifying, reducing the power consumption of at least one component in the first wireless station for a first time interval.

Also disclosed herein is an apparatus. The apparatus is in a first wireless station of a wireless network. The apparatus comprises a processing unit including a wireless transceiver coupled to an antenna. The processing unit is arranged to wirelessly receive a signal corresponding to a packet wirelessly transmitted by a second wireless station. The packet includes a subpacket and a check sequence. The apparatus further comprises a subpacket verifier coupled to the processing unit. The subpacket verifier is arranged to verify the integrity of the subpacket, the verifying at least using the check sequence. The apparatus further comprises a power saver coupled to the subpacket verifier. The power saver is arranged, in the case that the subpacket fails the verifying, to reduce the power consumption of at least one component in the first wireless station for a first time interval.

Also disclosed herein are a method and a carrier medium storing instructions to implement the method. The method is in a first wireless station of a wireless network. The method comprises generating a check sequence to protect the integrity of a subpacket of a packet, wherein the packet is to be wirelessly transmitted. The method further includes embedding the check sequence in an embedding field within the packet. The method further includes wirelessly transmitting the packet. The method is implemented such that a second wireless station wirelessly receiving a signal corresponding to the packet can verify the integrity at least using the check sequence of the subpacket. The method is further implemented such that, in the case that the subpacket fails the verifying in the second wireless station, the second wireless station can reduce power consumption of at least one component in the second wireless station for a time interval.

Also disclosed herein is an apparatus. The apparatus is in a first wireless station of a wireless network. The apparatus comprises a processing unit including a wireless transceiver coupled to an antenna. The processing unit is arranged to wirelessly transmit a packet. The packet includes a subpacket. The apparatus further comprises a check sequence generator coupled to the processing unit. The check sequence generator is arranged to generate a check sequence to protect the integrity of the subpacket. The check sequence generator is further arranged to embed the check sequence in an embedding field within the packet. The generating is implemented such that a second wireless station wirelessly receiving a signal corresponding to the packet can verify the integrity at least using the check sequence of the subpacket. The generating is further implemented such that, in the case that the subpacket fails the verifying in the second wireless station, the second wireless station can reduce power consumption of at least one component in the second wireless station for a time interval.

BRIEF DESCRIPTION OF THE DRAWINGS

FIG. 1 shows a simplified block diagram of an apparatus in which aspects of the present invention may be embodied. While FIG. 1 is labeled as prior art, the shown apparatus embodying one or more aspects of the present invention is not prior art.

DETAILED DESCRIPTION

Technology Background

Typical Wireless Apparatus

Transmissions in a wireless data network are typically logically organized into a number of layers such as those found in the International Standards Organization (ISO)/Open Systems Interconnect (OSI) network model. The two lowest layers, called the physical (PHY) layer and the data link layer respectively, are usually implemented in some variation of an apparatus shown in FIG. 1. The PHY layer typically manages the raw transmissions at the physical level, e.g., the electromagnetic level, and converts such raw transmissions to and from bits of data arranged in packets. The data link layer typically provides management and control information for the data stream such as some of the error management for the PHY layer, flow synchronization information and flow control information. For wireless networks that use multi-access transmission channels such as wireless local area networks (WLANS), the data link layer is often subdivided to include a medium access control (MAC) sublayer. The MAC sublayer, while considered by some to also encompass some aspects of the PHY layer, is considered here to be at the next layer up from the PHY layer.

Figure 1:
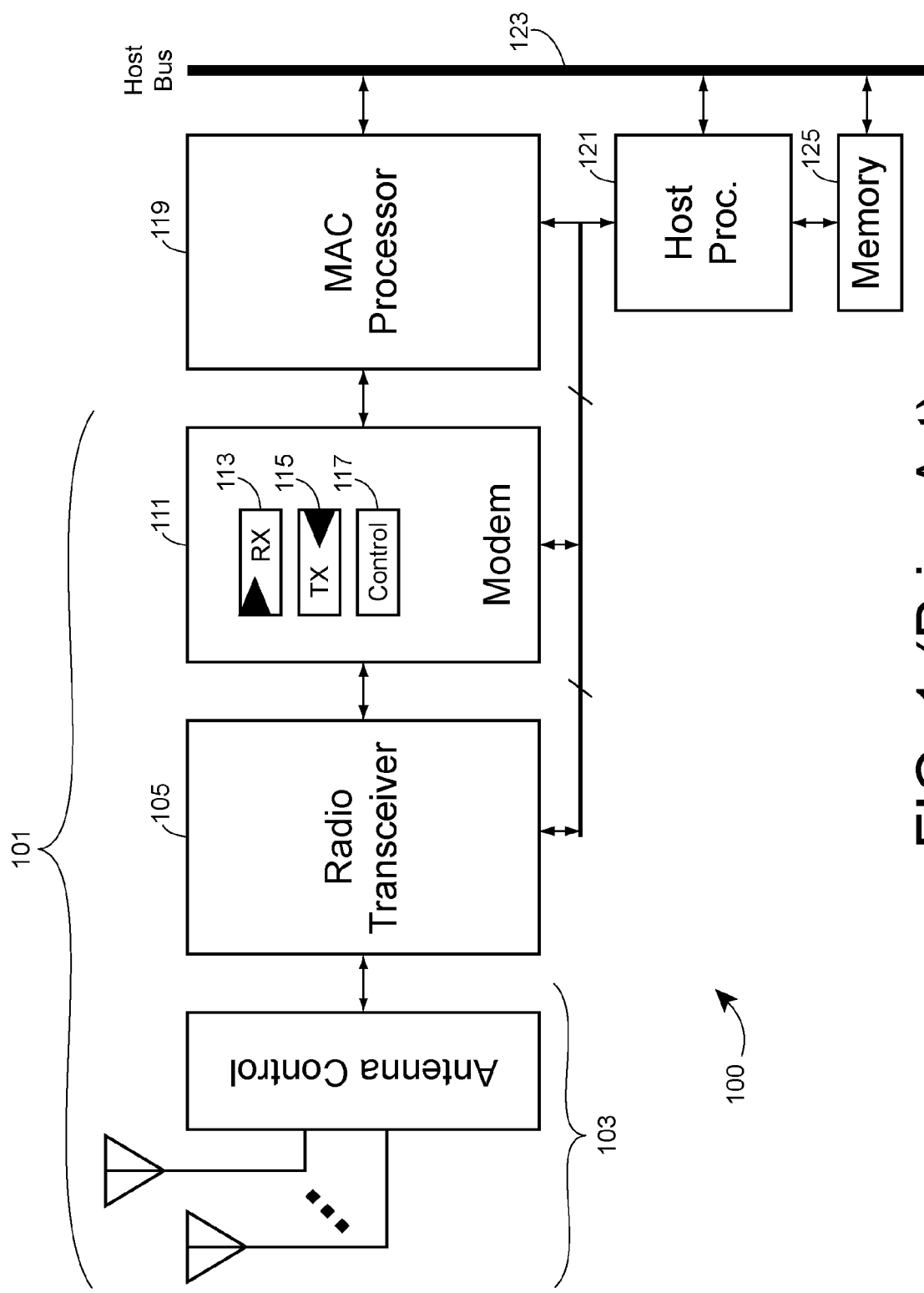

FIG. 1 shows a simplified block diagram of an apparatus in which aspects of the present invention may be embodied. While FIG. 1 is labeled as prior art, the shown apparatus embodying one or more aspects of the present invention is not prior art. The apparatus is logically subdivided into two separate components that respectfully handle the physical layer and MAC sublayer of wireless data transmissions. Of course, these two layers/sublayers may physically be handled by one piece of hardware. The apparatus is typical and, for example, may be implemented in a PCMCIA wireless local area network (LAN) card, a mini-PCI card, or in an access point of a wireless network.

The apparatus 100 includes a physical (PHY) layer interface processor 101 that include an antenna subsystem 103 with at least one antenna for the frequency of service, e.g., approximately 2.4 GHz and/or approximately 5 GHz for the one of the present IEEE 802.11 standards. The antenna subsystem 103, in the case of half-duplex operation, typically includes a transmit/receive switch, and for the case of switched diversity, typically includes a diversity switch to select an antenna.

The antenna subsystem 103 is coupled to a radio transceiver 105. The radio transceiver 105 provides an analog received signal to and accepts an analog signal for transmission from a modem 111. The radio receiver of the transceiver can include a low-noise amplifier and/or receive radio frequency (RF) electronics. The radio transmitter part of the transceiver can include transmit RF electronics and/or a power amplifier.

The modem 111 includes a receiver part 113, including, e.g., an analog-to-digital converter to digitize samples of the received signal and a demodulator/decoder. The modem 111 further includes a transmitter part 115, including, e.g., a digital-to-analog converter and a coder/modulator. The modem further includes a control part 117. For example, the control part 117 can implement start of packet (SOP) detection, automatic gain control, etc. The modem 111 can be coupled to the radio transceiver 105 via an analog interface for the received signal and the signal for transmission, and also via a digital interface for control signals and status flags.

The apparatus 100 further includes a medium access control (MAC) processor 119 for MAC processing. The MAC processor 119 accepts decoded/demodulated data from the modem 111 and provides data to be encoded/modulated to the modem 111. The MAC processor 119 is further connected to the modem 111 via another digital interface that provides access to the MAC processor 113 of various status flags and data registers in the modem 111.

The MAC processor 119 may optionally be coupled to a host processor 121 via a host bus subsystem 123. While FIG. 1 shows a separate host processor, the host processor function may optionally be incorporated with the MAC processor 119. A memory 125, e.g., a random access memory element (RAM), may be optionally included for program and/or data storage. The memory 125 is sometimes directly coupled to the host or to the MAC processor or to both. There may be additional memory, e.g., for buffering, and such additional memory can either be included in memory subsystem 125, or included in one or more components such as the MAC processor 119, or both. One or more interfaces may be included in apparatus 100, e.g., one or more interfaces that conform to well-known industry standards such as PCMCIA, PCI, USB, etc.

Clearly other architectures are possible for the PHY and MAC parts of a wireless station, and the invention is not limited to any particular architecture.

In some implementations, the transceiver, modem, and at least some of the MAC processor may be on the same processing unit, e.g., on the same chip.

IEEE 802.11 OFDM PLCP Header and MAC Frame

One embodiment of the invention is applicable to packets transmitted and received that conform to one of the OFDM variants of the IEEE 802.11 standard, e.g., IEEE 802.11a, 802.11g, or derivatives thereof Such an OFDM packet starts with a preamble that provides for start of packet detection, automatic gain control, diversity selection when diversity is used, various other synchronization functions, and channel estimation. The preamble is followed by a modulated part.

Figure 2A:
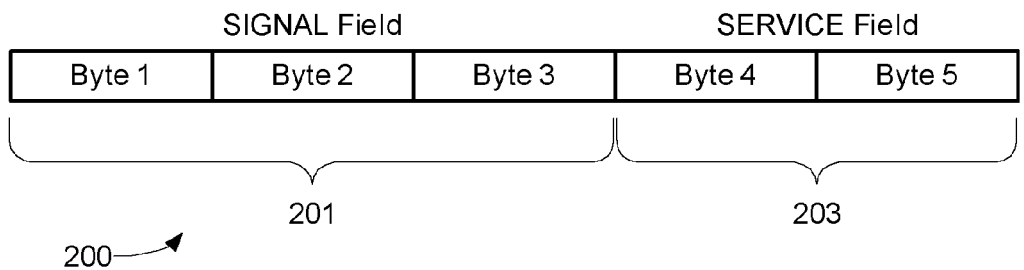
FIG. 2A shows a Physical Layer Control Protocol (PCLP) header that conforms exactly to the OFDM variants of the IEEE 802.11 standard. While it is labeled as prior art, such a header embodying one or more aspects of the present invention is not prior art.

FIG. 2A shows a Physical Layer Control Protocol (PCLP) header that conforms exactly to present-day OFDM variants of the IEEE 802.11 standard. While it is labeled as prior art, such a header embodying one or more aspects of the present invention is not prior art.

The PLCP header is the first part of the modulated payload. In FIG. 2A, the PCLP header 200 includes a 3-byte SIGNAL field 201 that is modulated at a low data rate. In particular, the SIGNAL field 201 is modulated at Binary Phase Shift Keying (BPSK) rate ½ and provides information about the packet, including the data rate at which the rest of the packet is encoded. The SIGNAL field 201 is followed by a 2-byte SERVICE field 203 that is modulated at the payload data rate specified in the SIGNAL field 201. The remainder of the modulated payload, called the PLCP Service Data Unit (PSDU), includes data at the payload data rate specified in the SIGNAL field 201.

Figure 2B:
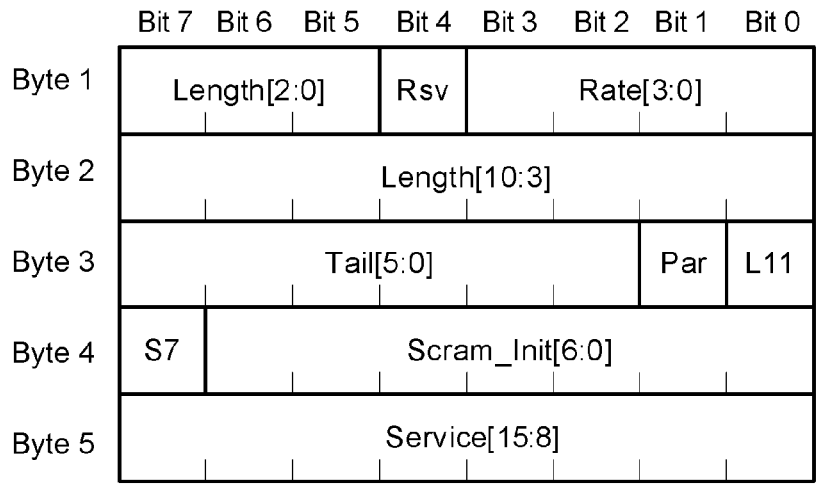
FIG. 2B shows the individual bits of the 5-byte PCLP header that conforms to the present-day OFDM variants of the IEEE 802.11 standard. While it is labeled as prior art, such a header embodying one or more aspects of the present invention is not prior art.

FIG. 2B shows the individual bits of the 5-byte PCLP header that conforms to the present-day OFDM variants of the IEEE 802.11 standard. While it is labeled as prior art, such a header embodying one or more aspects of the present invention is not prior art.

In FIG. 2B, the SIGNAL field 201 includes a RATE field of 4 bits denoted Rate [0] through Rate [3] that provide information on the data rate. The RATE information determines the coding rate and the modulation method used for the modulated payload beyond the SIGNAL field 201. The RATE field is followed by a reserved bit that is always 0, and a 12-bit LENGTH field whose bits are denoted Length [0] through Length [11]. The LENGTH field is followed by an even parity bit. This is followed by 6-tail bits of the SIGNAL field denoted Tail [0] through Tail [5] that are unused bits that should be set to 0.

The three-byte SIGNAL field 201 is followed by the two-byte SERVICE field 203 that includes 7 random scrambler initialization bits denoted Scram_Init[0] through Scram_Init [6], and nine SERVICE field bits denotes Service[7] through Service[15]. The latter are unused bits that should all be zero to conform exactly to the OFDM IEEE 802.11 standards. The SERVICE field 203 is modulated at the same data rate as the rest of the packet specified by the RATE field. U.S. patent application Ser. No. 10/629,383 filed Jul. 28, 2003 to inventors Keaney, et al., titled "EARLY DETECTION OF FALSE START-OF-PACKET TRIGGERS IN A WIRELESS NETWORK NODE," and assigned to the assignee of the present invention, describes the inclusion in the SERVICE field information that helps protect the integrity of such SIGNAL field that provides for a matching receiver to quickly determine whether or not a start of packet trigger is a false start of packet trigger. U.S. patent application Ser. No. 10/629,383 is incorporated herein by reference.

Figure 3:
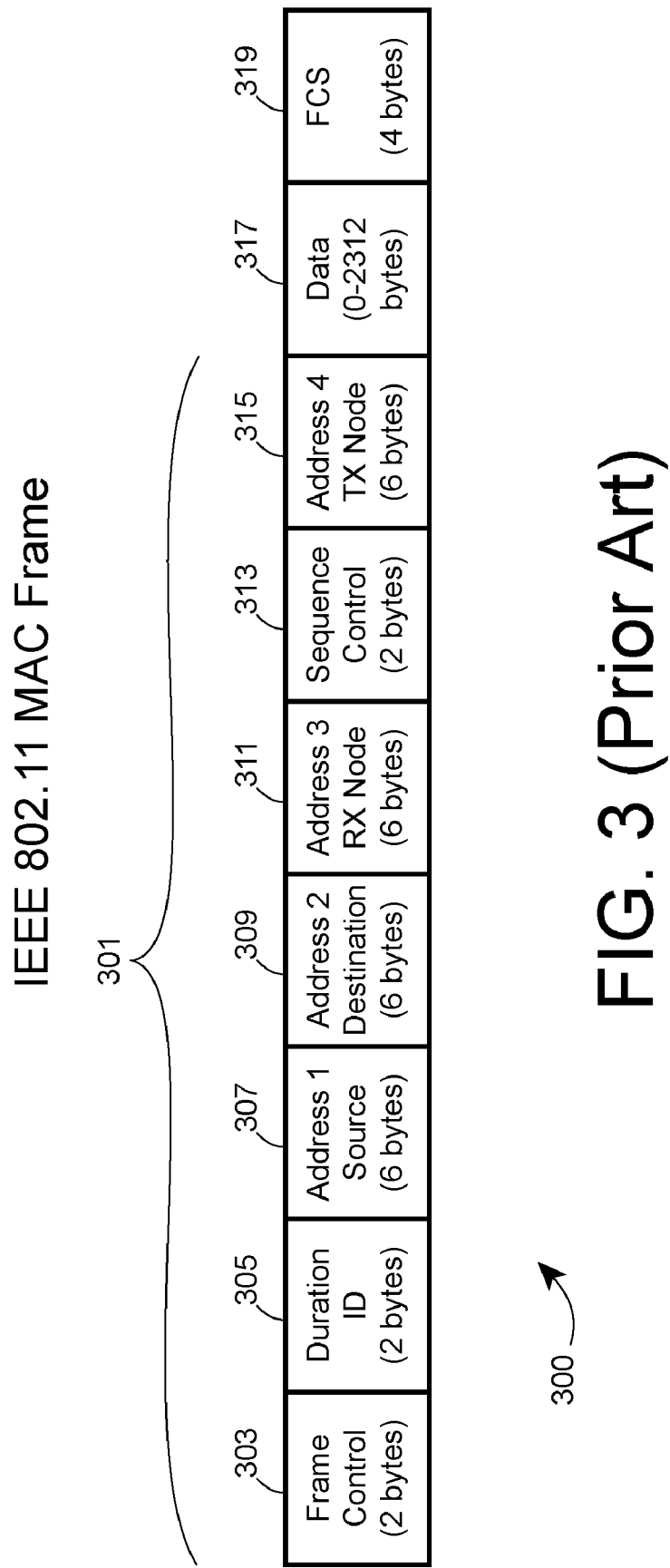
FIG. 3 shows a medium access control (MAC) frame including the MAC header that conforms to the IEEE 802.11 standard or a variant thereof.

FIG. 3 shows a MAC frame including the MAC header that conforms to the IEEE 802.11 standard or a variant thereof. While it is labeled as prior art, such a header embodying one or more aspects of the present invention is not prior art.

In FIG. 3, the MAC frame 300 includes the MAC header 301 of 30 bytes, the data field 303 containing the data payload of 0 to 2312 bytes, and a frame check sequence (FCS) field 319 of 4 bytes. The MAC header 301 includes a frame control field 303 of 2 bytes. The rest of the MAC header 301 includes a duration ID field 305 of 2 bytes, a source address field 307 of 6 bytes, a destination address field 309 of 6 bytes, a receiving station address field 311 of 6 bytes, a sequence control field 313 of 2 bytes, and a transmitting station address field 315 of 6 bytes. Various fields may not be included depending on the type of 802.11 MAC frame.

Wireless stations operating in independent basic service set (IBSS) mode or as access points must, according to the IEEE 802.11 standard, examine the MAC header in all received packets, including management frames, to the end of address 3 (311), regardless of destination address, for the purposes of power save management. All wireless stations must examine the MAC header in received packet, e.g., received control frames, to the end of address 1 (307) to determine which wireless station the MAC frame is for and to process the information in the duration ID field 305.

InterFrame Spacing

Aspects of the present invention incorporate interframe spacing to potentially increase aggregate transmission throughput between wireless stations of a wireless network.

Wireless data networks such as WLANs typically operate over shared channels with the potential for transmission collisions. Protocols and standards have been developed to manage transmissions on such wireless data networks. Typically transmissions are broken into packets by receivers and then reassembled by receivers. Packetization allows more than one transmitter to send messages over the same channel during the same aggregate time period.

One embodiment of the invention is applicable to packets of a wireless network that conforms to one of the IEEE 802.11 standards. Two general methods (protocols) are part of the IEEE 802.11 standard for managing shared channels over a wireless network. The distributed coordination function (DCF) protocol is typically used to manage wireless transmissions in a wireless network configured for ad-hoc or in a centralized wireless network, e.g., a wireless network with an access point (AP). The point coordination function (PCF) protocol may be used to manage wireless transmissions in a centralized wireless network.

Interframe spacing (IFS) refers to standard time intervals that separate different packets transmitted over a shared channel. Such time intervals are used to manage data, e.g., packets, that use the shared channel. Different IFS intervals exist to better manage packet transmission and reception, packet discovery, collision-avoidance, etc.

Figure 4:
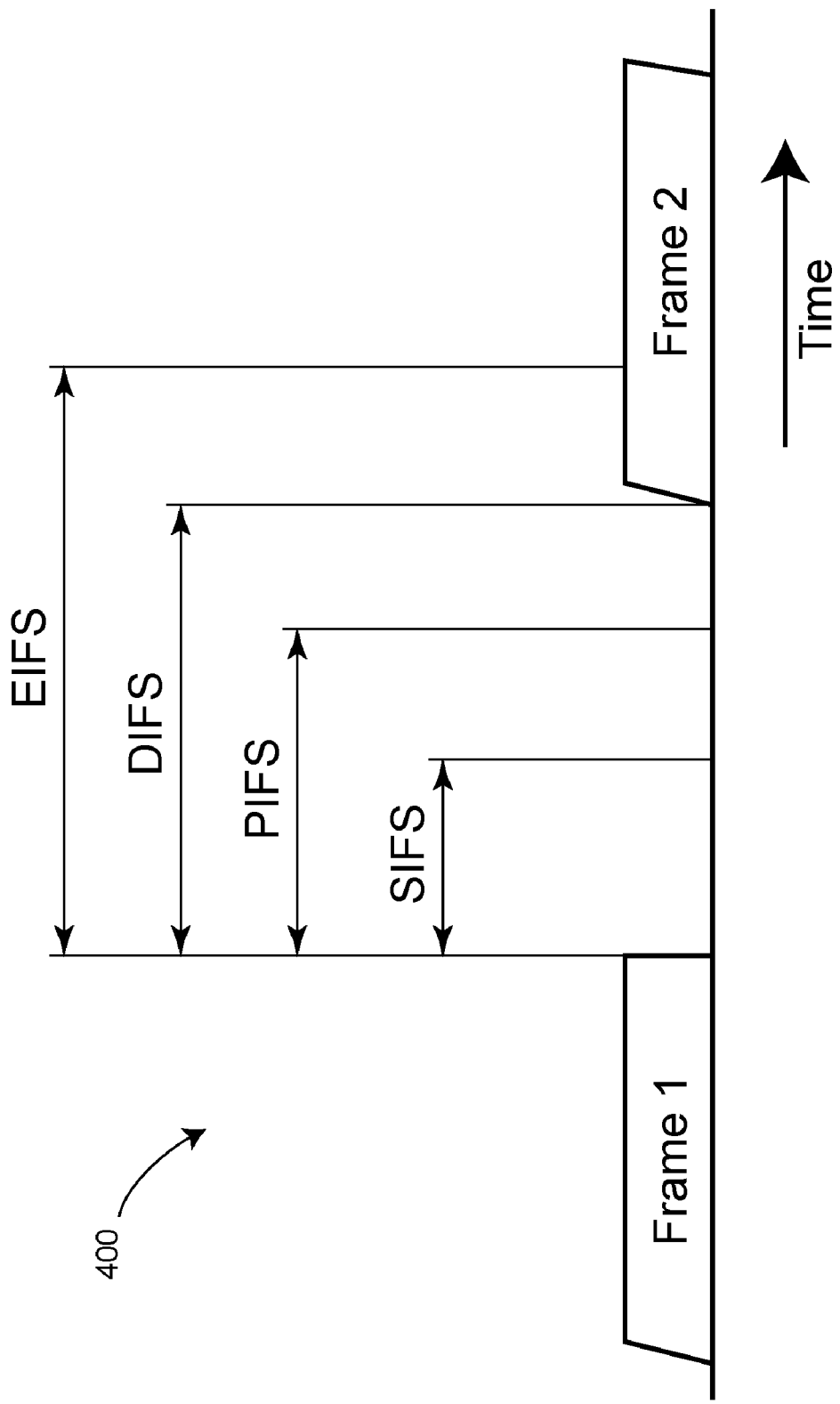
FIG. 4 shows a network flow diagram roughly comparing four different interframe spacings (IFSs) used in the IEEE 802.11 standard and its variants or derivative standards.

FIG. 4 shows a flow diagram 400 that contrasts four different IFS intervals used as part of the IEEE 802.11 standard and its variants. The short IFS (SIFS) is a short idle time used for highest priority transmission such as ready to send (RTS), clear to send (CTS) and acknowledgment (ACK) packets. The PCF IFS (PIFS) is the minimum idle time for a typical packet transmission operating in PCF mode and is longer than SIFS. The DCF IFS (DIFS) is the minimum idle time for typical packet transmissions and is longer than PIFS. The extended IFS is the minimum idle time when an error has occurred and is longer than DIFS.

Error Correcting/Detecting Codes

Aspects of the present invention incorporate error correcting/detecting codes to reduce power consumption in a wireless receiver.

There have been a number of techniques developed to detect and correct errors in transmissions. Error-correcting codes (ECCs) and error-detecting codes (EDC) are two classes of methods developed to overcome the problem of transmission errors. For wireless data networks, a wireless transmitter calculates and wirelessly transmits additional redundant signal along with the original signal it wishes to protect. The wireless receiver can detect and/or correct errors in the transmitted signal by performing a calculation using the received signal and the received redundant signal.

For wireless networks such as wireless data networks, redundant signals in the form of check sequences, e.g., one or more bits of redundant data, are often used to protect the integrity of part (or parts) of a packet, e.g., a subpacket. Check sequences are sometimes appended to the end of a subpacket. As an example, most additive checksum and polynomial (CRC) coding methods implemented today use appended check sequences. In other cases, check sequences are sometimes inter-mixed with the data it protects, e.g., Hamming codes.

An embodiment of a method in the patent application to Lam enables a wireless transmitter to generate a check sequence for a subpacket to be protected, e.g., where the check sequence is located in an embedding field located prior to the end of the subpacket. Such an embedding field can comprise of a contiguous series of bits, or an arbitrary, non-necessarily contiguous subset of bits of the packet. Further, this check sequence is generated in such a way that a wireless receiver wirelessly receiving the packet can verify the subpacket without manipulating or processing the check sequence, e.g., can verify the subpacket assuming the check sequence is located at the end of the subpacket. Such a method can reduce the complexity and cost in a receiving wireless station and is of importance to aspects of the present invention.

In one embodiment in the patent application to Lam, the check sequence is a polynomial (CRC) code checksum. For many wireless data network applications, polynomial (CRC) codes are often used to protect parts of a packet, e.g., sub-packets of a packet. Polynomial codes sometimes preferable compared to other ECC and EDC method for their simplicity, low transmission costs, e.g., small check sequences, and high error-detecting capability.

In one embodiment of the patent application to Lam, a wireless station generates a check sequence by first computing an appended check sequence and then multiplies the appended check sequence by a re-positioning matrix. In another embodiment, an apparatus contains a multiplier unit to compute an appended check sequence and then multiplies the appended check sequence by a re-positioning matrix. In another embodiment, the multiplier unit is implemented by a collection of XOR gates to form an XOR tree such that a multiplication can be calculated in O(log n) time.

In one embodiment of the related, above-mentioned incorporated-herein-by-reference U.S. patent application to Lam, one or more bits of a reserved field are used to store such a check sequence. For OFDM variants of the IEEE 802.11 packet, such a reserved field can be the SERVICE field of the packet. In another embodiment, a combination of using the PARITY bit in the SIGNAL field and at least one bit of the SERVICE field are used to form a check sequence. In another embodiment, the PARITY bit in the SIGNAL field is instead used as an indicator field to indicate the presence of a check sequence in the SERVICE field.

Lower Power Modes

Aspects of the present invention utilize low-power modes, e.g., sleep modes, to reduce power consumption in a wireless receiver.

Components of a wireless station are often split into two or more sub-components. Each component or sub-component can operate in a normal operating mode, or alternately one or more low-power modes. A component or unit operating in such a low-power mode is said to be sleeping or asleep. Implementations and techniques for implementing such low-power modes are widely known in the art.

A Power Saving Method Using Check Sequences

Method in a Receiving Wireless Station

Aspects of the invention are incorporated in a method, an apparatus, and a carrier medium including one or more computer readable code segments to instruct one or more processors of a processing system to implement a method.

In one embodiment of the invention, one or more check sequences of a packet are used to help determine whether or not to turn off one or more components of a wireless station when receiving a transmission. In particular, if a part of a packet is found to be with error on reception, e.g., an integrity verification using a check sequence fails, it can be efficient to simply turn off those components related to the receiving and processing functions until the end of the packet is reached. Additional aspects of the invention include methods to increase the transmission throughput in addition to saving power.

Figure 5:
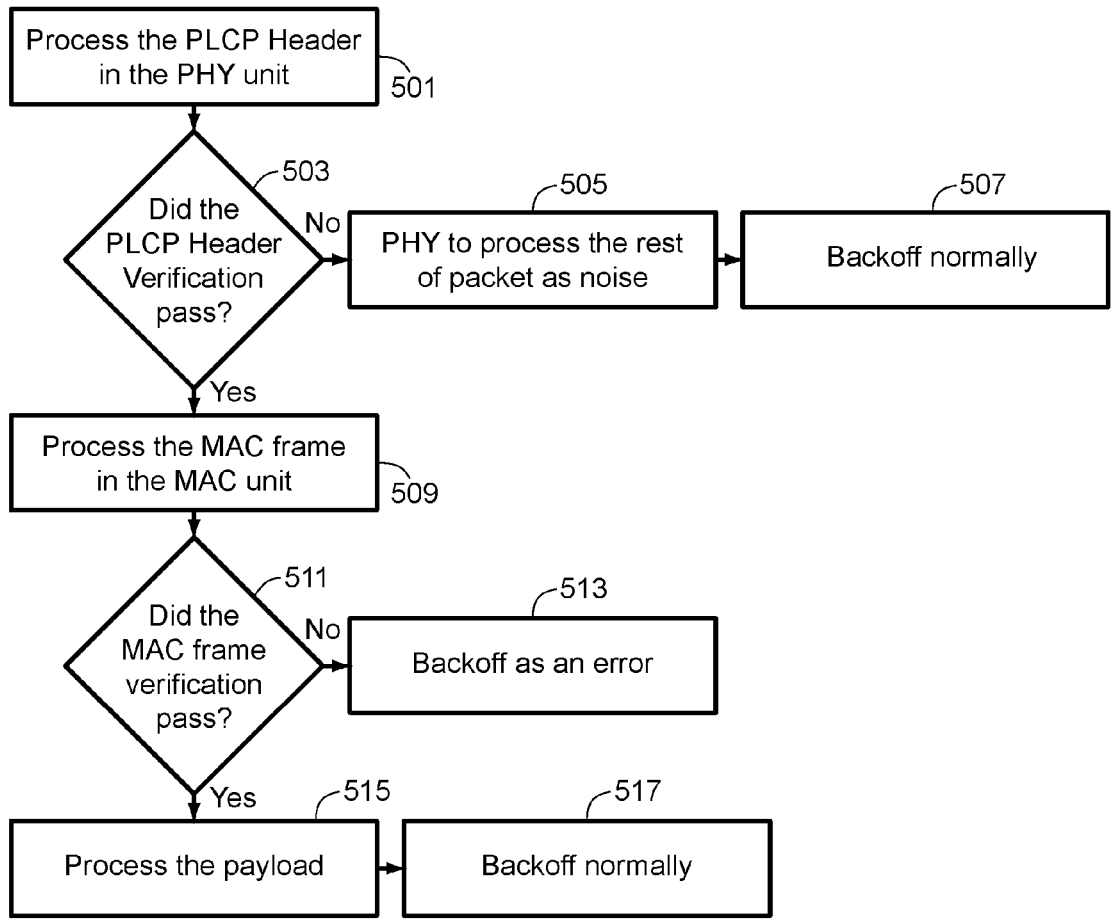
FIG. 5 shows a common method in a wireless station of a wireless data network conforming to an OFDM variant of the IEEE 802.11 standard for handling detected errors in a received packet.

FIG. 5 shows a common method in a wireless station of a wireless data network conforming to an OFDM variant of the IEEE 802.11 standard for handling detected errors in a received packet.

In FIG. 5, a method begins in the PHY processor following the processing of the preamble of the packet. Typically the first 3 bytes of the SIGNAL field are read (processed) to determine the RATE, LENGTH and PARITY 501. The PARITY bit is used to verify the integrity of the RATE and LENGTH fields. If the PARITY bit verification fails 503, then the PHY processor typically processes the rest of the packet as noise 505. The PHY processor must stay awake during the process to monitor the one or more transmissions channel(s) for an end-of-packet characteristic, e.g., the clear-channel-assessment (CCA) going low. Following that, the MAC processor typically performs a backoff using the DIFS timer 507, e.g., treating the packet as if it was not directed to the wireless station.

If the PARITY bit verification succeeds 503, the MAC processor is notified to begin processing the incoming bit stream 509. Typically integrity verification for the rest of the bit stream is performed in the MAC using the MAC FCS 511. If the integrity verification fails, the MAC processor performs a backoff using the EIFS timer 513, e.g., treating the packet as if it contained a transmission error.

If the MAC frame verification succeeds 511, the MAC processor performs a backoff using the DIFS timer 517, e.g., treating the packet as if it was received properly and the rest of the payload is processed by other units/components of the wireless station 515.

Figure 6:
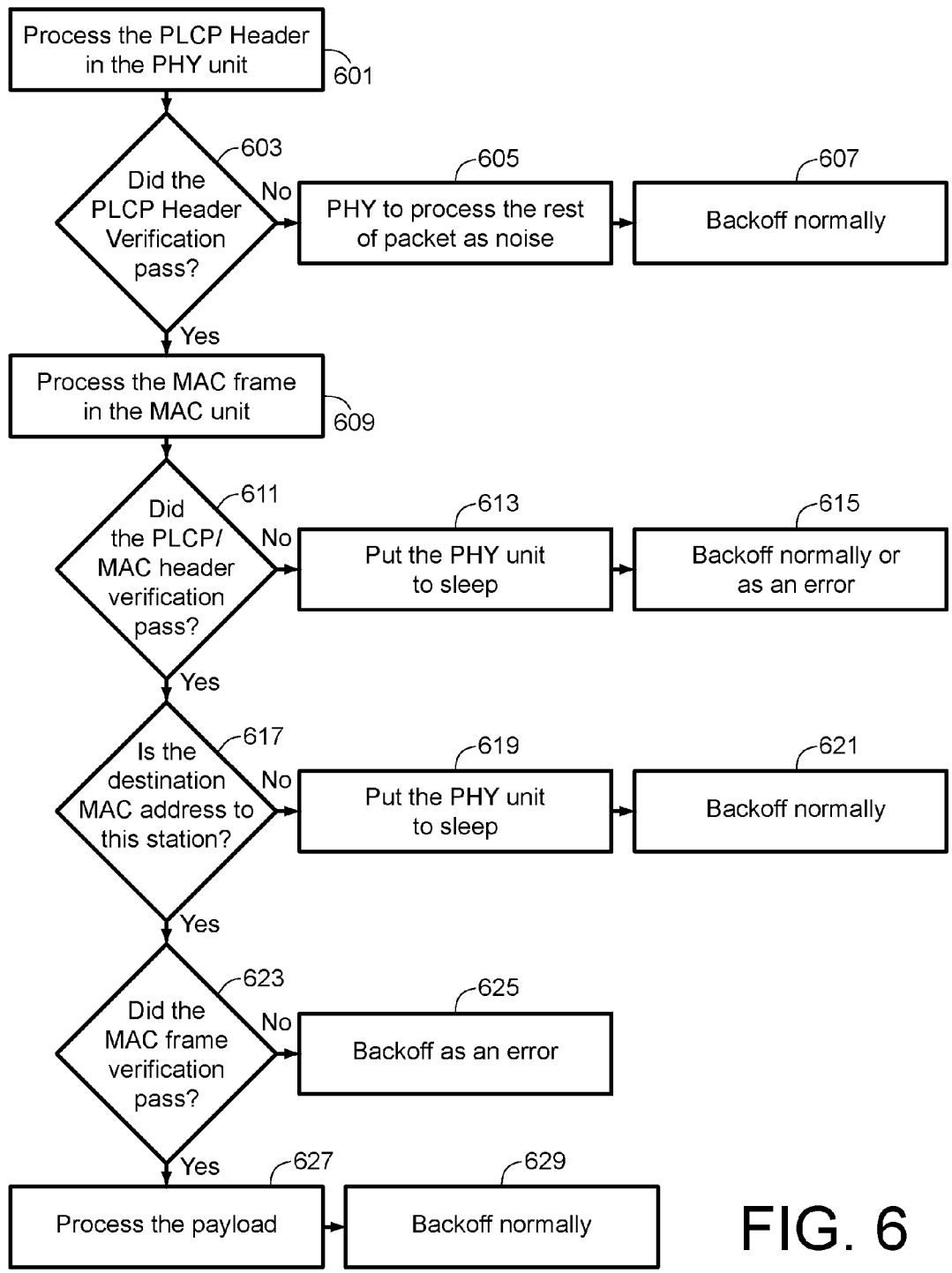
FIG. 6 shows a method embodying aspects of the present invention in a wireless station of a wireless data network conforming to an OFDM variant of the IEEE 802.11 standard for handling detected errors in a received packet.

FIG. 6 shows a method embodying aspects of the present invention in a wireless station of a wireless data network conforming to an OFDM variant of the IEEE 802.11 standard for handling detected errors in a received packet.

In FIG. 6, a method begins in the PHY processor following the processing of the preamble of the packet as in FIG. 5. Typically the first 3 bytes of the SIGNAL field are read (processed) to determine the RATE, LENGTH and PARITY 603. In one embodiment, the PARITY bit is used to verify the integrity of the RATE and LENGTH fields. In another embodiment, the parity bit assumes odd parity instead of even parity in a variation with the IEEE 802.11 standard. In another embodiment, a non-parity ECC/EDC method is used to verify the integrity of the SIGNAL field using a check sequence of at least one bit within the packet. In another embodiment, no PARITY bit verification is performed.

In one embodiment, if the PARITY bit verification fails 603, then the PHY processor processes the rest of the packet as noise 605. The PHY processor must typically stay awake during the process to monitor the one or more transmissions channel(s) for an end-of-packet characteristic, e.g., for the clear-channel-assessment (CCA) going low. In another embodiment, after the end-of-packet characteristic has been determined, the MAC processor performs a backoff using the DIFS timer 607, e.g., treating the packet as if it was not directed to the wireless station.

In one embodiment, if the PARITY bit verification succeeds 603, the MAC processor is notified to begin processing the incoming bit stream 609. In another embodiment, the integrity of at least one bit of the PLCP header, e.g., the SIGNAL field, is verified using a polynomial (CRC) check sequence located in at least one bit of the SERVICE field. In another embodiment, the integrity verification includes, in addition to at least one bit of the PLCP header, at least one bit of the MAC header. In another embodiment, the verifying includes a polynomial (CRC) code checksum calculation. In another embodiment, the verifying includes a polynomial (CRC) code checksum calculation using the generator polynomial of $x^8+x^2+x+1$. In another embodiment, integrity verification is performed in the PHY processor before the MAC processor begins processing the MAC frame (contrary to FIG. 6). In another embodiment, the MAC processor performs integrity verification. In another embodiment, the check sequence used for integrity verification is embedded, e.g., located prior to the end of the subpacket being protected. In another embodiment, the check sequence used for integrity verification uses at least one bit of the SERVICE field. In another embodiment, the integrity verification includes a calculation substantially conforming to a polynomial code checksum calculation.

In one embodiment of the invention, a check sequence is first detected by checking for one or more non-zero bits of the SERVICE field. In another embodiment, a check sequence is first detected by checking for certain values in one or more pre-defined fields of the packet. In another embodiment, the integrity verification is dependent upon ascertaining whether there is a check sequence in the packet. In another embodiment, such an ascertaining uses at least one bit of the packet, e.g., detecting value of 1 where normally it is 0.

In one embodiment, if a check sequence doesn't exist, then the method bypasses the PLCP/MAC header integrity verification 611. In another embodiment, the method does not check the PLCP/MAC header but proceeds to check the destination MAC address as in 617. In another embodiment, the destination MAC address is not checked at all and proceeds to verifying the entire MAC frame 623. In another embodiment, a user-settable parameter determines whether or not to check the destination MAC address as in 617.

In one embodiment, if the PLCP/MAC header verification fails 611, the PHY processor is put to sleep for a time interval calculated using the RATE and LENGTH fields of the received PLCP header 613. In another embodiment, one or more components of a wireless station are put to sleep for another time interval calculated using the RATE and LENGTH fields. In another embodiment, one or more components of a wireless station are put to sleep for an arbitrary time interval. In another embodiment, the MAC processor performs a backoff using the DIFS timer 615 in variance with the IEEE 802.11 standard, e.g., treating the packet as if it was not directed to the wireless station. In another embodiment, the MAC processor performs a backoff using the EIFS timer 615, e.g., treating the packet as if it contained a transmission error. In another embodiment, the MAC processor can select either a DIFS or EIFS backoff using a user-configurable parameter. Using DIFS backoffs as described in one or more embodiments of the present invention can result in a transmission throughput performance gain in the wireless station, albeit the wireless station may no longer be in strict conformance with the IEEE 802.11 standard.

In one embodiment, if the PLCP/MAC header integrity verification succeeds 611, the MAC processor begins processing the MAC header and the MAC payload. In one embodiment of the invention, the MAC destination address is determined by examining contents of the MAC header. In another embodiment, the MAC destination address is determined using one of the address fields of the MAC header depending on the To DS and From DS fields of the Frame Control Field according to the IEEE 802.11 standard, e.g., checking whether the destination address corresponds to the receiving wireless station's wireless address. In one embodiment, if the destination check fails, the PHY processor is put to sleep for a time interval calculated using the RATE and LENGTH field of the received PLCP header 619. In another embodiment, one or more components of the wireless station are put to sleep for a time interval calculated using the RATE and LENGTH fields. In another embodiment, one or more components of the wireless station are put to sleep for an arbitrary time interval. In another embodiment, the MAC processor then performs a backoff using the DIFS timer 621. (According to the IEEE 802.11 standard, the MAC processor must assume that the MAC header is valid due to the earlier verification.)

In one embodiment, if the destination check succeeds 617, the MAC processor is notified to begin processing the incoming bit stream as normal. Typically verification is performed using the MAC FCS and the entire MAC frame 623. In one embodiment, if the verification fails 623, the MAC processor performs a backoff using the EIFS timer 625, e.g., treating the packet as if it contained a transmission error.

In one embodiment, if the MAC frame verification succeeds 623, the MAC processor performs a backoff using the DIFS timer 629, e.g., treating the packet as if it was received properly and the rest of the payload is processed by other units/components of the wireless station 627

Apparatus in a Receiving Wireless Station

The various embodiments of the method described above are substantially incorporated into one or components of an apparatus of a wireless station.

Figure 7:
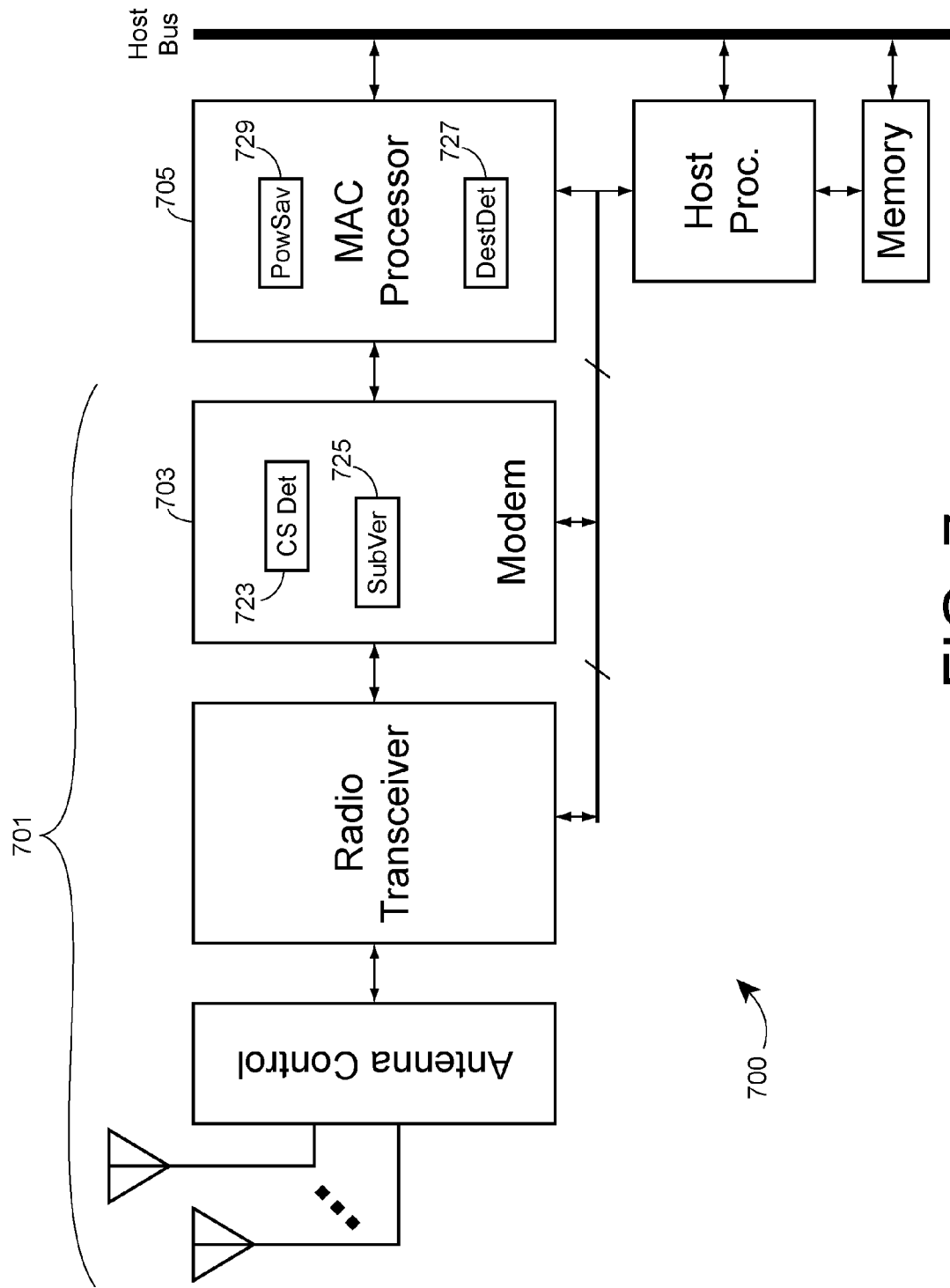
FIG. 7 shows a simplified block diagram of an embodiment of the present invention including a check sequence detector, a subpacket verifier, a destination determiner, and a power saver.

FIG. 7 shows a simplified block diagram of an embodiment of the present invention including a check sequence detector, a subpacket verifier, a destination determiner, and a power saver. The embodiment is similar to the apparatus shown in FIG. 1 with additional aspects of the present invention. In FIG. 7, the apparatus 700 includes a physical (PHY) layer interface processor (processing unit) 701 coupled to a MAC processor 705.

In one embodiment, a check sequence detector 723 is located in the physical (PHY) processor 701, and is incorporated into the modem 703 as shown in FIG. 7. In another embodiment, the check sequence detector 723 is located in the MAC processor 705. In another embodiment, the check sequence detector 723 is connected to the MAC processor and/or the physical (PHY) processor 701 via a data bus and/or data path. The check sequence detector 723 is arranged to ascertain whether there is a check sequence in a wirelessly received packet as described in the method subsection above. In one embodiment, the check sequence detector 723 is coupled directly to the MAC processor 705. In another embodiment, the check sequence detector 723 is coupled to the MAC processor 705 through the modem 703.

In one embodiment, a subpacket verifier 725 is located in the physical (PHY) processor 701, and is incorporated into the modem 703 as shown in FIG. 7. In another embodiment, the subpacket verifier 725 is located in the MAC processor 705. In another embodiment, the subpacket verifier 725 is connected to the MAC processor and/or the physical (PHY) processor 701 via a data bus and/or data path. The subpacket verifier 725 is arranged to verify the integrity of a subpacket as described in the method subsection above. In one embodiment, the subpacket verifier 725 is coupled directly to the MAC processor 705. In another embodiment, the subpacket verifier 725 is coupled to the MAC processor 705 through the modem 703. In another embodiment, the subpacket verifier 725 is coupled to the check sequence detector 723.

In one embodiment, a destination determiner 727 is located in the MAC processor 705 as shown in FIG. 7. In another embodiment, the destination determiner 727 is located in the physical (PHY) processor 701. In another embodiment, the destination determiner 727 is connected to the MAC processor and/or the physical processor 701 via a data bus and/or data path. The destination determiner 727 is arranged to determine a destination of the packet as described in the method subsection above. In one embodiment, the destination determiner 727 is coupled directly to the physical (PHY) processor 701. In another embodiment, the destination determiner 727 is coupled to the physical (PHY) processor 701 through the MAC processor 705. In another embodiment, the destination determiner 727 is coupled to the check sequence detector 723. In another embodiment, the destination determiner 727 is coupled to the subpacket verifier 725.

In one embodiment, a power saver 729 is located in the MAC processor 705 as shown in FIG. 7. In another embodiment, power saver 729 is located in the physical (PHY) processor 701. In another embodiment, the power saver 729 is connected to the MAC processor and/or the physical processor 701 via a data bus and/or data path. The power saver 729 is arranged to reduce the power consumption of at least one component in the wireless station as described in the method subsection above. In one embodiment, one of the components for power reduction is the physical (PHY) processor 701. In another embodiment, the power saver 729 is coupled directly to the physical (PHY) processor 701. In another embodiment, the power saver 729 is coupled to the physical (PHY) processor 701 through the MAC processor 705. In another embodiment, the power saver 729 is coupled to the check sequence detector 723. In another embodiment, the power saver 729 is coupled to the subpacket verifier 725. In another embodiment, the power saver 729 is coupled to the destination determiner 727.

Method in a Transmitting Wireless Station

In one embodiment of the invention, a packet is generated and transmitted by a first wireless station such that a second wireless station wirelessly receiving a signal corresponding to the packet can reduce power consumption and/or increase transmission throughput as described in the method and apparatus of the previous subsections.

In one embodiment, a check sequence is generated to protect the integrity of a subpacket of the packet to be wirelessly transmitted. In another embodiment, the check sequence is a check sequence, e.g., the check sequence is located in an embedding field prior to the end of the subpacket. In another embodiment, the check sequence is a check sequence such that a wireless receiver receiving the packet can sequentially process the subpacket to verify the integrity of the subpacket as if the check sequence was appended at the end of the subpacket. An example of such a method is described in the patent application to Lam.

In one embodiment, at least one bit of the packet to be transmitted is set to some value to indicate to a wireless station receiving the packet that the packet contains a check sequence protecting a subpacket, e.g., enabling a receiving wireless station to ascertain that a check sequence protecting a subpacket within a packet. In another embodiment, the embedding field for storing the check sequence is not located at the end of the packet. In another embodiment, generating the check sequence includes a calculation substantially conforming to a polynomial (CRC) code checksum calculation. In another embodiment, the packet to be wirelessly transmitted substantially conforms to one of the OFDM variants of the IEEE 802.11 standard or a derivative thereof.

In one embodiment, the embedding field includes at least one bit of the SERVICE field. In another embodiment, the subpacket includes at least one bit of a PLCP header and at least one bit of the MAC header. In another embodiment, the generating of the check sequence includes a polynomial (CRC) code checksum calculation. In another embodiment, the generating includes a polynomial (CRC) code checksum calculation using the generator polynomial of $x^8+x^2+x+1$. In another embodiment, such an integrity verification is performed in the MAC processor. In another embodiment, such an integrity verification is performed in the PHY processor before the MAC processor begins processing the MAC frame (contrary to FIG. 6).

Apparatus in a Transmitting Wireless Station

The various embodiments of the method described above are substantially incorporated into one or more components of an apparatus of a wireless station.

Figure 8:
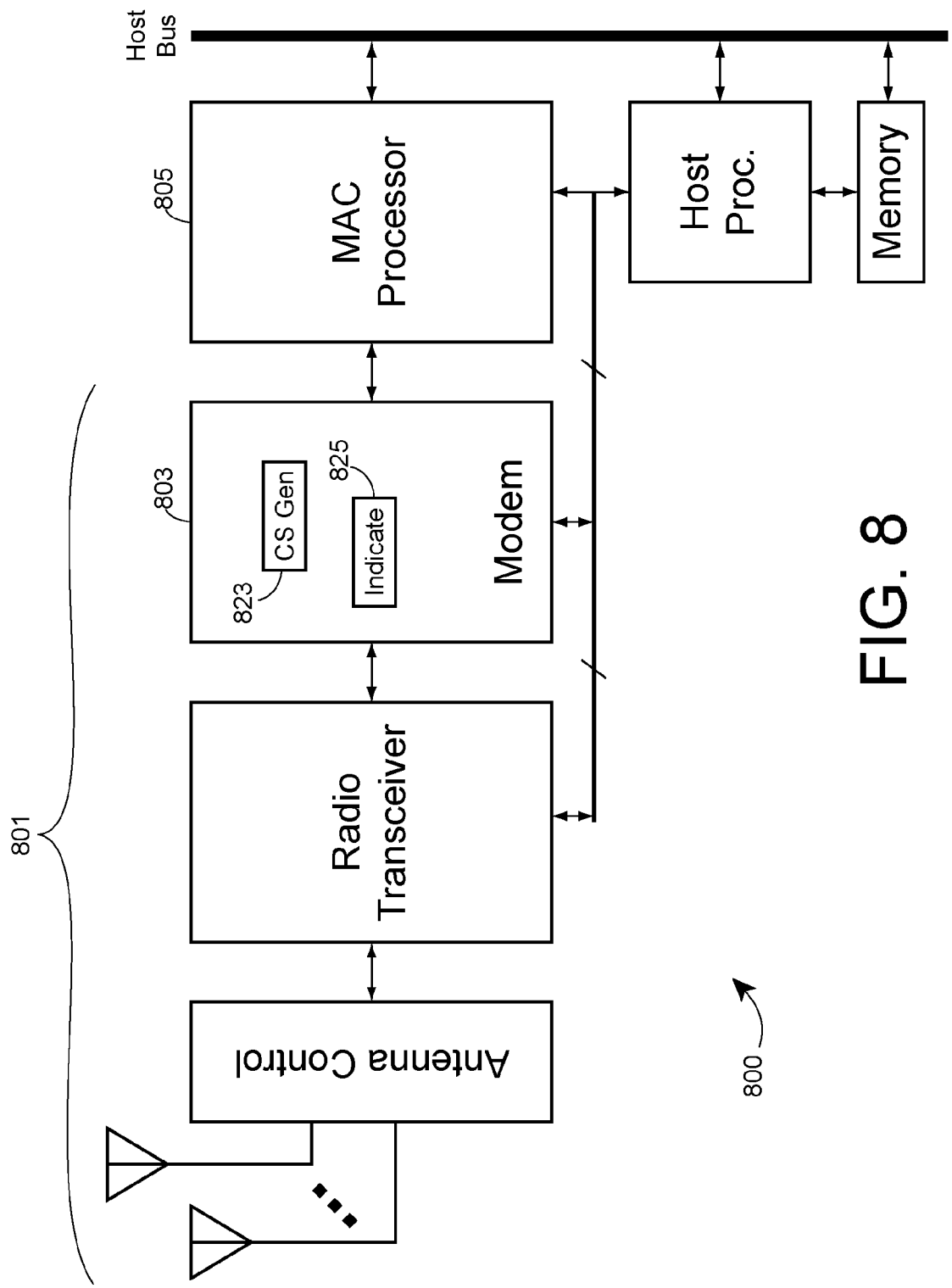
FIG. 8 shows a simplified block diagram of an embodiment of the present invention including a check sequence generator and an indicator unit.

FIG. 8 shows a simplified block diagram of an embodiment of the present invention including a check sequence generator and an indicator unit. The embodiment is similar to the apparatus shown in FIG. 1 with additional aspects of the present invention. In FIG. 8, the apparatus 800 includes a physical (PHY) layer interface processor (processing unit) 801 coupled to a MAC processor 805.

In one embodiment, a check sequence generator 823 is located in the physical (PHY) processor 801, and is incorporated into the modem 803 as shown in FIG. 8. In another embodiment, the check sequence detector 823 is located in the MAC processor 805. In another embodiment, the check sequence detector 823 is connected to the MAC processor and/or the physical (PHY) processor 801 via a data bus and/or data path. The check sequence generator 823 is arranged to generate a check sequence to protect the integrity of the subpacket and to embed the check sequence in an embedding field within the packet as described in the method subsection above. In one embodiment, the check sequence generator 823 is coupled directly to the MAC processor 805. In another embodiment, the check sequence generator 823 is coupled to the MAC processor 805 through the modem 803.

In one embodiment, a indicator unit 825 is located in the physical (PHY) processor 801, and is incorporated into the modem 803 as shown in FIG. 8. In another embodiment, the indicator unit 825 is located in the MAC processor 805. In another embodiment, the indicator unit 825 is connected to the MAC processor and/or the physical (PHY) processor 801 via a data bus and/or data path. The indicator unit 825 is arranged to set at least one bit of a packet such that a wireless station can ascertain whether there is a check sequence in the packet as described in the method subsection above. In one embodiment, the indicator unit 825 is coupled directly to the MAC processor 805. In another embodiment, the indicator unit 825 is coupled to the MAC processor 805 through the modem 803. In another embodiment, the indicator unit 825 is coupled to the check sequence generator 823.

Wireless Station Coexistence

One aspect of the invention is setting one or more bits of an unused portion of a packet substantially conforming to a wireless networking standard. In one embodiment, such a wireless networking standard is one of the OFDM variants of the IEEE 802.11 standard or a derivative thereof.

One embodiment of the invention utilizes unused bits of the SERVICE field of the packet to transmit additional data such as a check sequence. As such, wireless stations making use of one or more embodiments of the present invention may co-exist on the same wireless network with other wireless stations that do not use any embodiments of the present invention.

OTHER EMBODIMENTS

Figure 9:
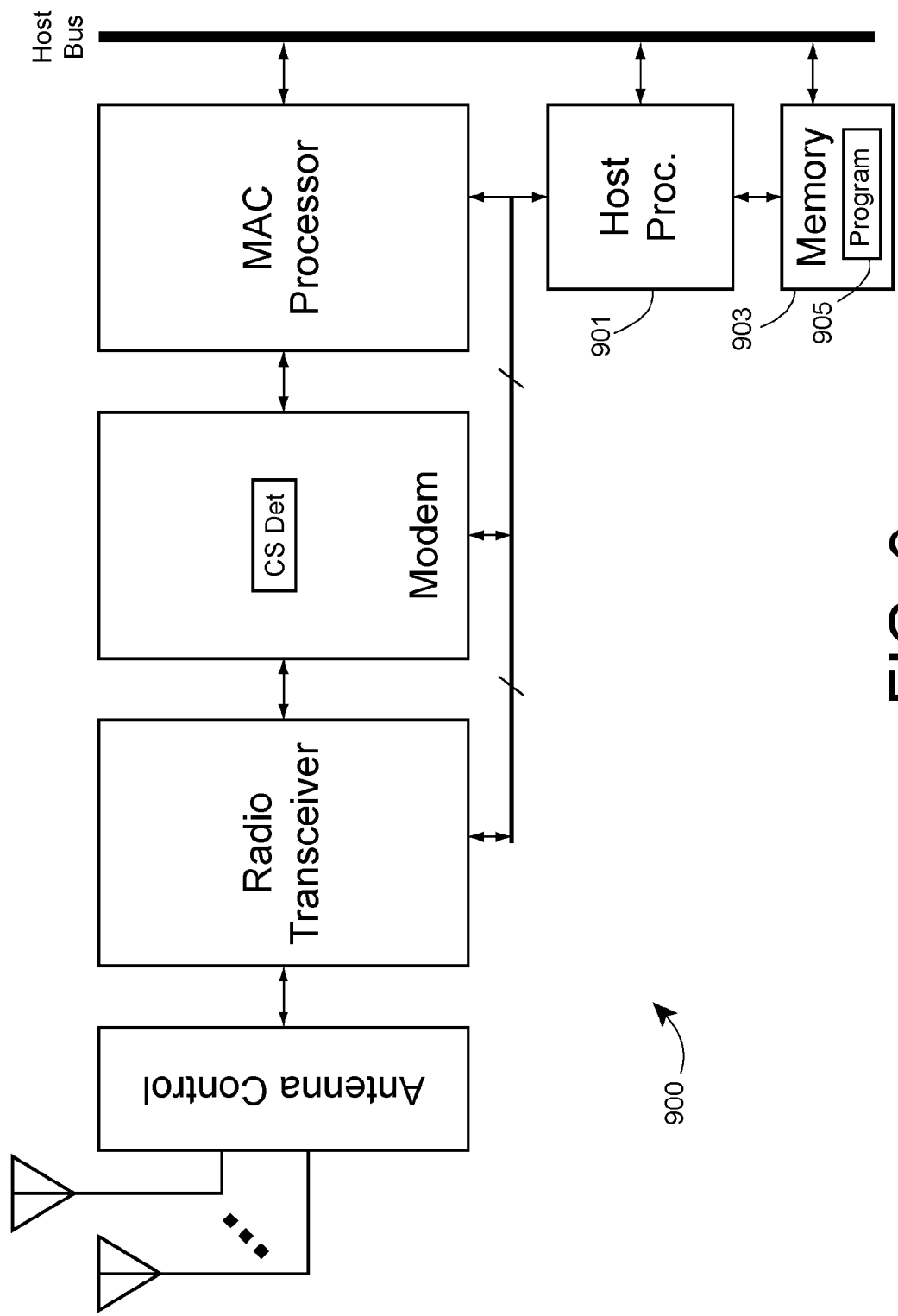
FIG. 9 shows a simplified block diagram of an embodiment of the present invention including a check sequence detector, wherein one or more elements are in the form of computer readable code in a memory.

FIG. 9 shows a simplified block diagram of an embodiment of the present invention including a check sequence detector, wherein one or more elements are in the form of computer readable code in the memory of the host processor. In particular, the apparatus 900 contains a host processor 901 coupled to a memory 903. The memory 903 contains a carrier medium 905 that includes one or more computer readable code segments to instruct the host processor 901 to implement a method. Such a method can be any method embodiment of the present invention.

Another aspect of the invention involves the location of the embedding field. One embodiment of the invention requires the embedding field to be located prior to the end of the subpacket to be protected. In another embodiment of the invention, the embedding field is not necessarily a subset of the subpacket to be protected, e.g., the embedding field is a subset of the packet but not necessarily entirely included in the subpacket to be protected. In another embodiment of the invention, the embedding field is entirely located in the subset of the subpacket to be protected.

One aspect of the invention makes use of one or more bits of a packet to indicate to a receiver receiving the packet that a frame in the packet contains a check sequence. In one embodiment of the invention, a transmitter sets one or more bits of a packet to a value, e.g., setting one or more bits of the indication field to 1 when they are normally 0, etc. In another embodiment of the invention, a receiver determines whether or not the packet includes a check sequence by checking the indication field, e.g., checking if one or more bits of the indication field are set to 1 when they are normally 0. In another embodiment of the invention, the check sequence includes the indication field. In another embodiment of the invention, an apparatus contains an indication unit to indicate that the frame contains a check sequence. In another embodiment of the invention, an apparatus contains an indication unit to determine whether or not a frame includes a check sequence.

In one embodiment of the invention, a calculation substantially conforming to a polynomial (CRC) code checksum calculation occurs when generating a check sequence. In another embodiment of the invention, a calculation substantially conforming to a polynomial (CRC) code checksum calculation occurs when verifying a frame containing a check sequence. In yet another embodiment of the invention, such calculations occur in both the generating of a check sequence and the verifying of a frame containing a check sequence.

Variations

It is well known in the art that the arrangement of bits in a sequence depends on the context of the application. For example, a particular bit-order depends on the protocols/standards that are employed and underlying/dependent hardware and/or software that is used, e.g., most-significant bit (MSB) order vs. least-significant bit (LSB) order. Furthermore, different encoding schemes may interleave or scramble bits from one context to another. In other words, bits in a "logical" context may not necessarily be ordered in the same way that bits in a "real" context are ordered. It is also well known in the art that data processor units may not necessarily process packets sequentially in their respective bit-order. Thus, no attempt has been made to explicitly enumerate all the possible bit-orderings for transmitting, receiving, processing and/or generating bits of data. Therefore, all possible bit-ordering and bit-encoding schemes, and their derivatives and variants, are hereby incorporated as alternate embodiments of the invention.

Those in the art will be aware that the logical "end" of an arbitrary part of a packet, e.g., a subpacket, is dependent on context. In particular, a check sequence being "appended" to the end of a subpacket of a packet, can have at least three different interpretations depending on context. In one case, a subpacket contains a pre-defined field at the end of the subpacket that is used to store the check sequence. An example of this is the IEEE 802.11 MAC frame that contains a 4-byte frame check sequence (FCS) field. In another case, the end of the subpacket does not contain a pre-defined field at the end, and as such, the processing unit processing the subpacket adds a check sequence to the end of the subpacket, thereby extending the subpacket's length. An example of this includes many standard CRC modules (both in software and hardware). In yet another case, the embedding field for the subpacket is located before the end of the subpacket. An example of this are the methods for embedding a check sequence described in the patent application to Lam. Therefore, all such variations to the "end" of a region or "before the end" of a region are hereby incorporated as alternate embodiments of the invention.

Embodiments of the invention are able to protect arbitrary, not-necessarily contiguous regions of a packet. Furthermore, fields where check sequences are located, e.g., embedding fields, are also not-necessarily contiguous regions. Thus, it is to be clearly expressed that subpackets, embedding fields, check sequences, or any generic field of a packet may not necessarily be contiguous and may occupy different levels or sublevels of a packet. Therefore all possible contiguous and non-contiguous variations to such regions are hereby incorporated as alternate embodiments of the invention.

The application refers to copying, embedding, inserting, replacing, etc. as descriptive but generically equivalent phrases to refer to the act of setting one or more states of a packet, buffer, field, memory region, etc. Therefore, it is to be clearly recognized that no further action is either implied or intended by using descriptive phrases when referring to the act of setting one or more states of a packet, buffer, memory region, etc.

Those in the art will understand that there are many variations of the implementation of the apparatus shown in FIG. 1, which are incorporated into many aspects of the present invention. There has not been an attempt to describe all possible variations and as such, it should be appreciated that many common variations, derivatives and modifications exist. Therefore, all such variations, derivatives and modifications are hereby incorporated as alternate embodiments of the present invention.

It is well known in the art that there are many variations and derivatives of the general polynomial (CRC) coding method. Many polynomial (CRC) coding standards have been established in the art. Examples of some CRC coding standards include CRC-8, CRC-12, CRC-16, CRC-CCITT, XMODEM-CRC and CRC-32. Embodiments of the invention may make reference to one or more polynomial (CRC) code methods. Although polynomial (CRC) code standards exist, embodiments of the present invention are not limited to any particular polynomial (CRC) code standard, nor are they limited to any particular variation of derivative of the general polynomial coding method. Thus all such variations and derivatives are hereby incorporated as alternate embodiments of the invention.

One embodiment of the invention uses the embedding of a check sequence as described in the incorporated herein by reference patent application referred as "Lam." In Lam, in one embodiment, the check sequence is generated such that a wireless station wirelessly receiving a signal corresponding to a transmitted packet containing a protected subpacket can sequentially verify the integrity of the subpacket as if the check sequence were appended at the end of the subpacket being protected, such as would occur with a typical polynomial, e.g., CRC verifier that assumes there is a check sequence appended at the end. Thus, a prior art polynomial, e.g., CRC verifier can verify such a check sequence. By this is included the case that the wireless station can serially verify the integrity of the subpacket without needing to process the check sequence more than once, i.e. more than when first encountered. By this is also included the case that the wireless station can verify the integrity of the subpacket without needing to storing, e.g., to buffer the embedded check sequence. All these cases are meant to be included in the phrase "sequentially verify the integrity of the subpacket as if the check sequence were appended at the end of the subpacket being protected."

In several embodiment of the invention, the wireless network and/or the packets being transmitted/received over the wireless network substantially conform to an OFDM variant of the IEEE 802.11 standard or a derivative thereof. It is well known in the art that the invention is not limited to such contexts and may be utilized in various wireless network applications and systems. Furthermore, embodiments or aspects of the invention are not limited to any one type of architecture or protocol, and thus, may be utilized in conjunction with one or a combination of other architectures/protocols. For example, the invention may be embodied in devices conforming to other standards and for other applications, including other WLAN standards, Bluetooth, IrDA, and other wireless communication standards. Thus, all such contexts are hereby incorporated as alternate embodiments of the invention.

One embodiment of each of the methods described herein is in the form of a computer program that executes on a processing system, e.g., one or more processors that are part of wireless station of a wireless network. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (e.g., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of wireless networks, the invention is not limited to such contexts and may be utilized in various other applications and systems, for example in a node of a cellular phone network or in a system that uses radio transmission to communicate via satellite. Furthermore, the invention is not limited to any one type of network architecture and method of encapsulation, and thus may be utilized in conjunction with one or a combination of other network architectures/protocols.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a first wireless station of a wireless network, the method comprising:
   wirelessly receiving a signal corresponding to a packet wirelessly transmitted by a second wireless station, wherein the packet includes a subpacket and a check sequence;
   verifying the integrity of the subpacket, the verifying at least using the check sequence; and
   in the case that the subpacket fails the verifying, reducing the power consumption of at least one component in the first wireless station for a first time interval,
   wherein the packet substantially conforms to one of the variants of the IEEE 802.11 standard, and wherein the first time interval is set according to one or more parameters of the packet.

2. A method as recited in claim 1, wherein the verifying includes a calculation substantially conforming to a polynomial code checksum calculation.

3. A method as recited in claim 1, wherein the wireless network operates according to a wireless network protocol that includes a backoff procedure, the method further comprising, in the case that the subpacket fails the verifying, carrying out a backoff procedure according to the wireless network protocol.

4. A method in a first wireless station of a wireless network, the method comprising:
   generating a check sequence to protect the integrity of a subpacket of a packet,
   wherein the packet is to be wirelessly transmitted;
   embedding the check sequence in an embedding field within the packet; and
   wirelessly transmitting the packet;
   such that a second wireless station wirelessly receiving a signal corresponding to the packet can verify the integrity of the subpacket at least using the check sequence and, in the case that the subpacket fails the verifying, can reduce power consumption of at least one component in the second wireless station for a time interval,
   wherein the packet substantially conforms to one of the variants of the IEEE 802.11 standard, and wherein the time interval is set according to one or more parameters of the packet.

5. A method as recited in claim 4, wherein the generating includes a calculation substantially conforming to a polynomial code checksum calculation.

6. A method as recited in claim 4, wherein the embedding field is located prior to the end of the subpacket.

7. An apparatus in a first wireless station of a wireless network, the apparatus comprising:
   a processing unit including a wireless transceiver coupled to an antenna, the processing unit arranged to wirelessly receive a signal corresponding to a packet wirelessly transmitted by a second wireless station, wherein the packet includes a subpacket and a check sequence;
   a subpacket verifier coupled to the processing unit arranged to verify the integrity of the subpacket, the verifying at least using the check sequence; and
   a power saver coupled to the subpacket verifier arranged, in the case that the subpacket fails the verifying, to reduce the power consumption of at least one component in the first wireless station for a first time intervals,
   wherein the packet substantially conforms to one of the variants of the IEEE 802.11 standard, and wherein power saver is configured such that the first time interval is set according to one or more parameters of the packet.

8. An apparatus as recited in claim 7, wherein the subpacket verifier is located inside the processing unit.

9. An apparatus as recited in claim 7, wherein the subpacket verifier is further arranged to include a calculation substantially conforming to a polynomial code checksum calculation.

10. An apparatus in a first wireless station of a wireless network, the apparatus comprising:
    a processing unit including a wireless transceiver coupled to an antenna, the processing unit arranged to wirelessly transmit a packet, wherein the packet includes a subpacket; and
    a check sequence generator coupled to the processing unit, the check sequence generator arranged to generate a check sequence to protect the integrity of the subpacket and to embed the check sequence in an embedding field within the packet,
    such that a second wireless station wirelessly receiving a signal corresponding to the packet can verify the integrity of the subpacket at least using the check sequence and, in the case that the subpacket fails the verifying, can reduce power consumption of at least one component in the second wireless station for a time interval,
    wherein the packet substantially conforms to one of the variants of the IEEE 802.11 standard, and wherein the time interval is set according to one or more parameters of the packet.

11. An apparatus as recited in claim 10, wherein the check sequence generator is further arranged to include a calculation substantially conforming to a polynomial code checksum calculation.

12. A computer-readable and tangible carrier medium carrying one or more computer readable code segments to instruct one or more processors of a processing system to implement a method in a first wireless station of a wireless network, the method comprising:

wirelessly receiving a signal corresponding to a packet wirelessly transmitted by a second wireless station, wherein the packet includes a subpacket and a check sequence;

verifying the integrity of the subpacket, the verifying at least using the check sequence; and in the case that the subpacket fails the verifying, reducing the power consumption of at least one component in the first wireless station for a first time interval, wherein the packet substantially conforms to one of the variants of the IEEE 802.11 standard, and wherein the first time interval is set according to one or more parameters of the packet.

13. A method as recited in claim 12, wherein the wireless network operates according to a wireless network protocol that includes a backoff procedure, and wherein the method further comprises, in the case that the subpacket fails the verifying, carrying out a backoff procedure according to the wireless network protocol.

14. An apparatus in a first wireless station of a wireless network, the apparatus comprising:

means for wirelessly receiving a signal corresponding to a packet wirelessly transmitted by a second wireless station, wherein the packet includes a subpacket and a check sequence;

means for verifying the integrity of the subpacket, the verifying at least using the check sequence; and means for, in the case that the subpacket fails the verifying, reducing the power consumption of at least one component in the first wireless station for a first time interval, wherein the packet substantially conforms to one of the variants of the IEEE 802.11 standard, and wherein the time interval is set according to one or more parameters of the packet.

* * * * *